(12) United States Patent
Hill et al.

(10) Patent No.: US 11,880,080 B2
(45) Date of Patent: Jan. 23, 2024

(54) FIBER OPTICS DEPLOY REEL

(71) Applicant: Clearfield, Inc., Minneapolis, MN (US)

(72) Inventors: John P. Hill, Oak Grove, MN (US);
Joshua J. Povlitzki, Otsego, MN (US);
Dalen Defoe, Chanhassen, MN (US)

(73) Assignee: Clearfield, Inc., Minneapolis, MN (US)

( * ) Notice: Subject to any disclaimer, the term of this patent is extended or adjusted under 35 U.S.C. 154(b) by 0 days.

(21) Appl. No.: 17/888,132

(22) Filed: Aug. 15, 2022

(65) Prior Publication Data

US 2022/0390699 A1  Dec. 8, 2022

Related U.S. Application Data

(63) Continuation of application No. 16/935,330, filed on Jul. 22, 2020, now Pat. No. 11,415,767.

(51) Int. Cl.
*G02B 6/44* (2006.01)
*B65H 75/24* (2006.01)

(52) U.S. Cl.
CPC ......... *G02B 6/4457* (2013.01); *B65H 75/241* (2013.01); *B65H 2701/32* (2013.01)

(58) Field of Classification Search
CPC .................................................... B65H 75/241
See application file for complete search history.

(56) References Cited

U.S. PATENT DOCUMENTS

| 4,570,869 | A | * | 2/1986 | Tsuji | B65H 75/2227 242/118.5 |
|---|---|---|---|---|---|
| 9,478,963 | B1 | * | 10/2016 | Klein | H02G 11/02 |
| 10,589,957 | B2 | * | 3/2020 | Thakare | B65H 75/14 |
| 2005/0175307 | A1 | * | 8/2005 | Battey | G02B 6/3897 385/135 |
| 2008/0135676 | A1 | * | 6/2008 | Hafner | B65H 75/2272 242/608.5 |
| 2014/0219622 | A1 | * | 8/2014 | Coan | G02B 6/4471 29/428 |

* cited by examiner

*Primary Examiner* — Charlie Y Peng
(74) *Attorney, Agent, or Firm* — Troutman Pepper Hamilton Sanders LLP

(57) ABSTRACT

An adjustable height optical fiber cable reel comprises a first piece having a first base plate and a first tab protruding from the first base plate, the first tab having a first opening and a second opening, a second piece having a second base plate and a second tab protruding from the second base plate, the second tab having a pin. The pin is configured to engage the first opening to lock the adjustable height reel at a first height, and to engage the second opening to lock the adjustable height reel at a second height. The adjustable height reel may also be coupled to a slack storage tray. Optical fiber enclosures may also be configured with adjustable height reels with optional slack storage trays.

19 Claims, 13 Drawing Sheets

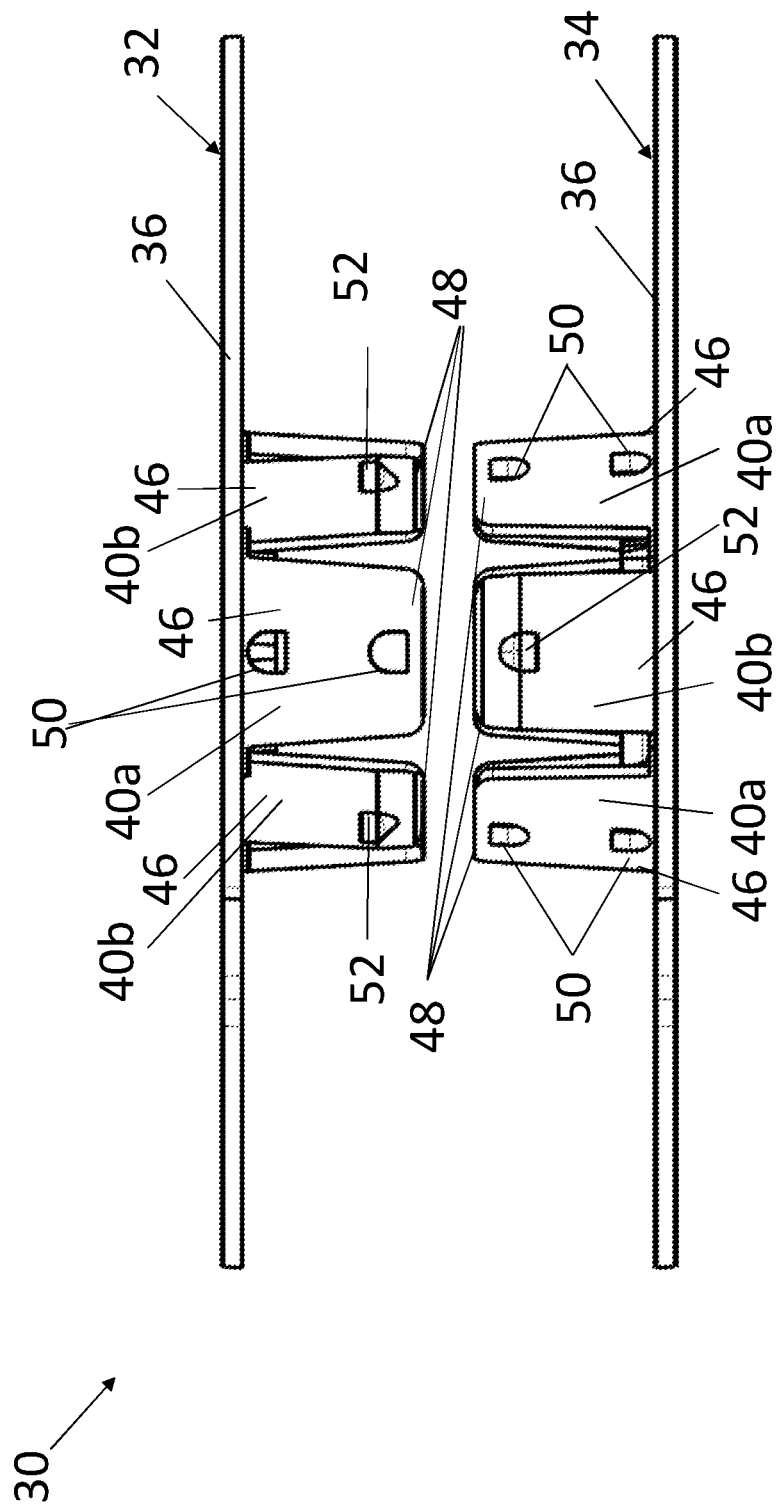

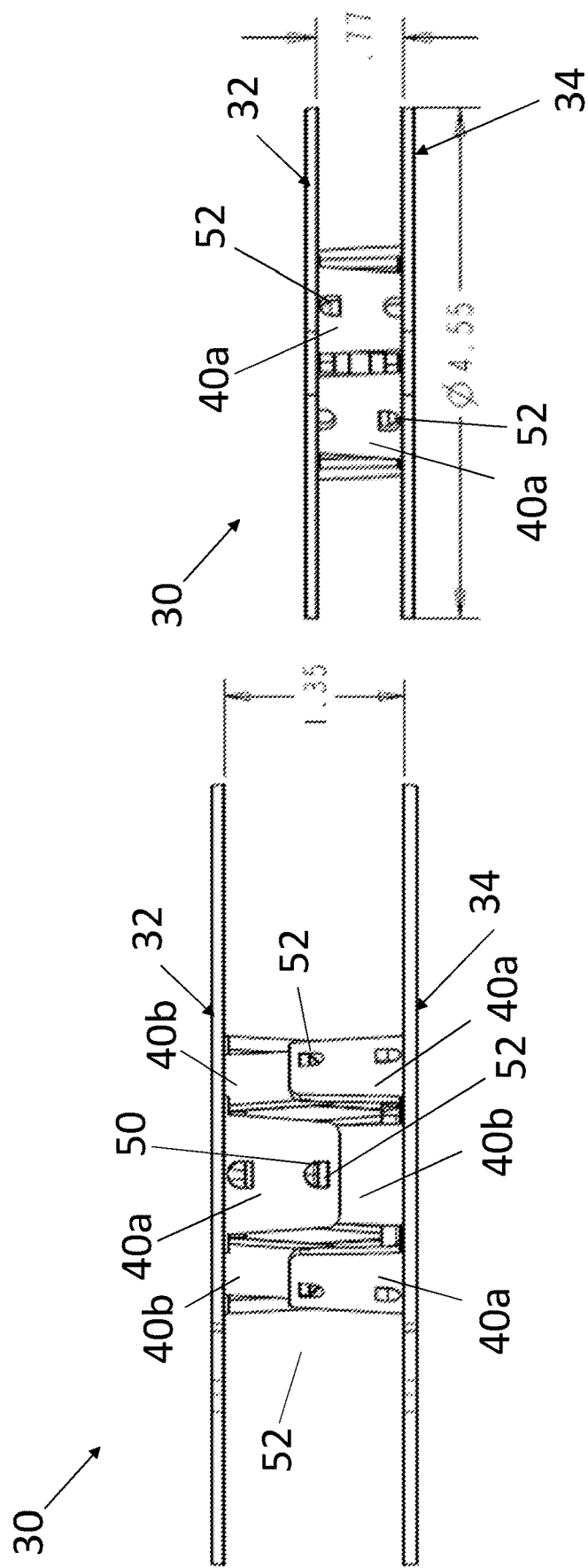

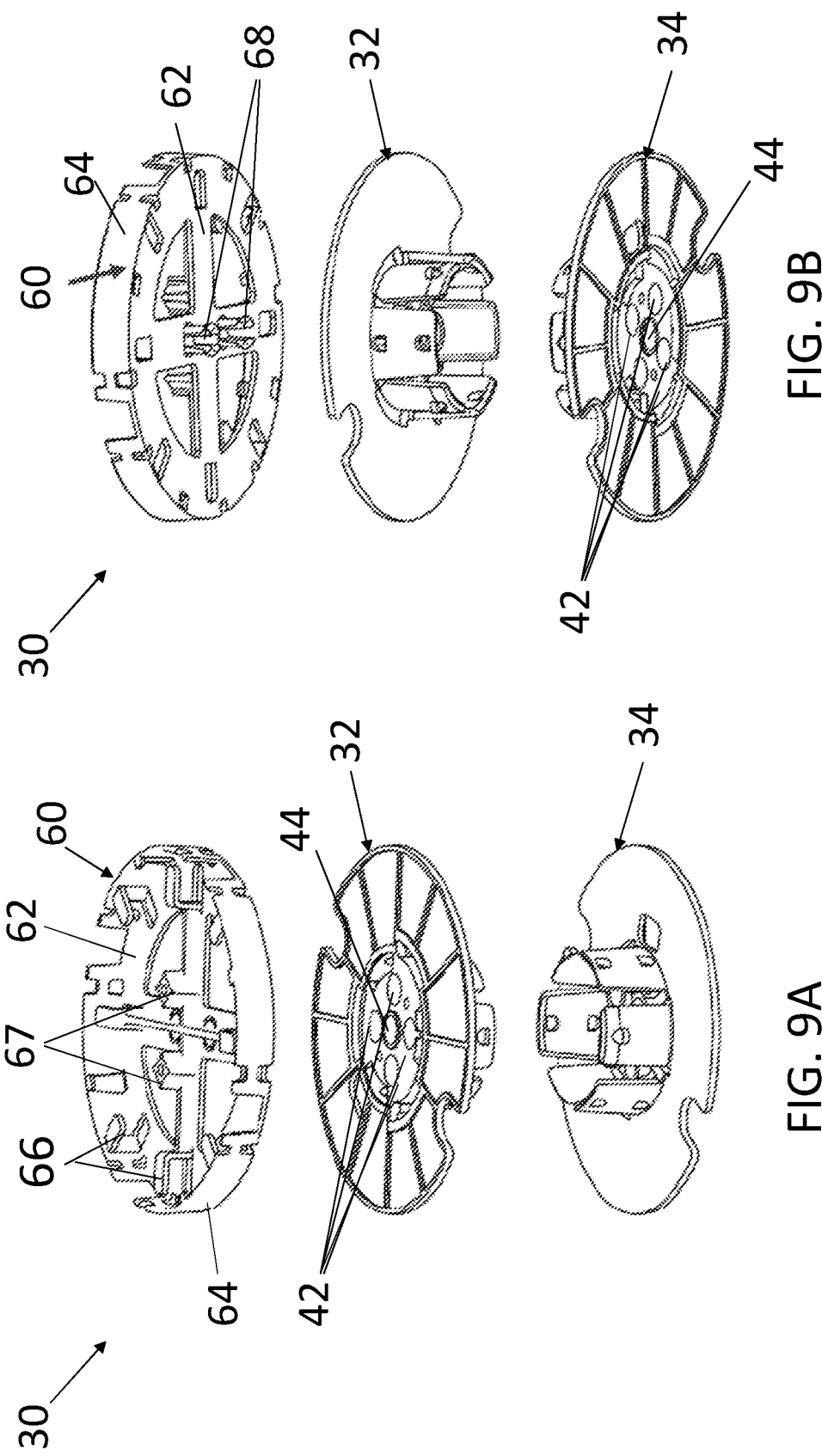

FIBER OPTICS DEPLOY REEL

CROSS REFERENCE TO RELATED APPLICATION

This application is a continuation of U.S. patent application Ser. No. 16/935,330 filed Jul. 22, 2020, and, entitled, "Fiber Optics Deploy Reel," the contents of which is incorporated herein by reference in its entirety.

TECHNICAL FIELD

The present disclosure relates generally to optical fiber storage and management, and more particularly to an optical fiber deploy reel.

BACKGROUND

Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber or to provide termination connection ports for end users at which one or more fibers may be branched from a feed cable. In instances when the connection may be exposed to weather conditions, an essentially waterproof configuration of components is needed.

To interconnect the cables, various cable connector designs provide for low insertion loss and stability. Some example connectors may include, but are not limited to, SC, Dual LC, LC, ST and MPO connectors. In most of these designs, ferrules (one in each connector, or one in the connector and one in the apparatus or device), each containing an optical fiber end, are butted together end to end and light travels across the junction.

With the increasing desire for completely optical networks, "fiber to the premises" (FTTP) or "fiber to the home" (FTTH) systems are being developed to provide optical fibers that extend from the source to the site of the end-user. Optical fiber enclosures are used for management of cables that extend to various user locations. There is a need for flexible, customizable fiber distribution and storage solutions that may be easily reconfigured to accommodate different lengths of optical fiber cable for different configurations of optical fiber networks.

SUMMARY

According to one aspect, there is provided an adjustable height reel comprising a first piece having a first base plate and a first tab protruding from the first base plate, the first tab having a first opening and a second opening. The adjustable height reel also comprises a second piece having a second base plate and a second tab protruding from the second base plate, the second tab having a pin. The pin is configured to engage the first opening to lock the adjustable height reel at a first height, and to engage the second opening to lock the adjustable height reel at a second height. The first opening may be disposed at a distal portion of the first tab and the second opening may be disposed at a proximal portion of the first tab. The pin may be disposed at a distal portion of the second tab. The second height may be smaller than the first height.

In some embodiments, the first piece and the second piece may include a first plurality of tabs, each tab of the first plurality of tabs having a respective first opening and a respective second opening, and a second plurality of tabs, each tab of the second plurality of tabs having a respective pin, wherein the respective pins are configured to engage the respective first openings to lock the adjustable height reel at the first height, and to engage the respective second openings to lock the adjustable height reel at the second height. The first plurality of tabs and the second plurality of tabs may be arranged in an alternating order along each the first piece and the second piece. The first plurality of tabs and the second plurality of tabs may be arranged to form a cylindrical structure. The first base plate and the second base plate may have a first diameter and the cylindrical structure formed by the tabs may have a second diameter smaller than the first diameter. The respective first openings may be disposed at a distal portion of the first plurality of tabs and the respective second openings may be disposed at a proximal portion of the first plurality of tabs. The respective pins may be disposed at a distal portion of the second plurality of tabs. The second height may be smaller than the first height. In various embodiments, the first piece and the second piece may be substantially identical.

In various embodiments, the adjustable height reel may further comprise a slack storage tray configured to couple to at least one of the first piece and the second piece. At least one of the first piece and the second piece may further comprise a central portion having a plurality of receptacles for coupling to the slack storage tray. The slack storage tray may comprise a plurality of protrusions configured to hold slack fiber.

According to another aspect, there is provided an enclosure comprising a housing having an interior space and a cover, and an adjustable height reel configured to mount within the interior space. The adjustable height reel comprises a first piece having a base plate and a plurality of tabs emanating therefrom and forming a cylindrical structure at a central portion of the base plate, wherein the plurality of tabs includes a first type and a second type arranged in alternating order, each tab of the first type having a respective first opening at a distal portion of the tab and a respective second opening at a proximal portion of the tab, and each tab of the second type having a respective pin at a distal portion of the tab. The adjustable height reel further comprises a second piece configured substantially identical to the first piece and configured to couple to the first piece.

The respective pins of the plurality of tabs of the second type on the first piece may be configured to engage the respective first openings of the plurality of tabs of the first type on the second piece to lock the adjustable height reel at a first height, and to engage the second openings of the plurality of tabs of the first type on the second piece to lock the adjustable height reel at a second height. The respective pins of the plurality of tabs of the second type on the second piece are configured to engage the respective first openings of the plurality of tabs of the first type on the first piece to lock the adjustable height reel at the first height, and to engage the second openings of the plurality of tabs of the first type on the first piece to lock the adjustable height reel at the second height. The second height may be smaller than the first height. In some embodiments, the enclosure may further comprise a slack storage tray configured to couple to at least one of the first piece and the second piece.

The present disclosure is not limited in terms of the particular embodiments described in this application, which are intended as illustrations of various aspects. Many modi-

BRIEF DESCRIPTION OF THE FIGURES

FIG. 5 is a side view of the two pieces of the cable reel of FIG. 2 prior to assembly according to aspects of the present disclosure;

FIGS. 6A and 6B are side views of the cable reel of FIG. 2 in high and low positions according to aspects of the present disclosure;

FIGS. 9A and 9B are perspective views of the disassembled cable reel of FIG. 7 according to aspects of the present disclosure;

DETAILED DESCRIPTION

Aspects of the present disclosure are directed at optical fiber cable deploy reels for fiber storage, management and deployment. Embodiments of the optical fiber cable reels disclosed herein may be configured for use in optical fiber enclosures, such as wall boxes, pedestals, fiber distribution cabinets, and terminals at various network locations, for example, at multi-dwelling units, single family units, cellular towers and business class services. Embodiments of the optical fiber reels may be configured to accept a variety of optical fiber cables, which allows the reels to be integrated into any network architecture and deployment.

Various embodiments of optical fiber reels and enclosures disclosed herein simplify fiber deployment. For example, the distance to a user location may be unknown. Embodiments of optical fiber reels disclosed herein may be configured to allow optical fiber cable to be pulled out of an enclosure to a desired length, and any slack storage may be held in the spool. Thus, various embodiments eliminate the need for exact fiber cable lengths, and protect excess fiber by storing it on the spool. Various embodiments may have a built-in feature that locks the spool in place once the optical fiber has been pulled to the specified location.

Various embodiments of optical fiber reels disclosed herein may be configured to be attached to optical fiber enclosures. Embodiments may be mounted in different orientations within an enclosure depending on the desired cable storage, slack, and deployment configuration. Some embodiments may be configured to receive additional cable routing features, such as a connector, adapter, sleeve, etc.

Figure 1:
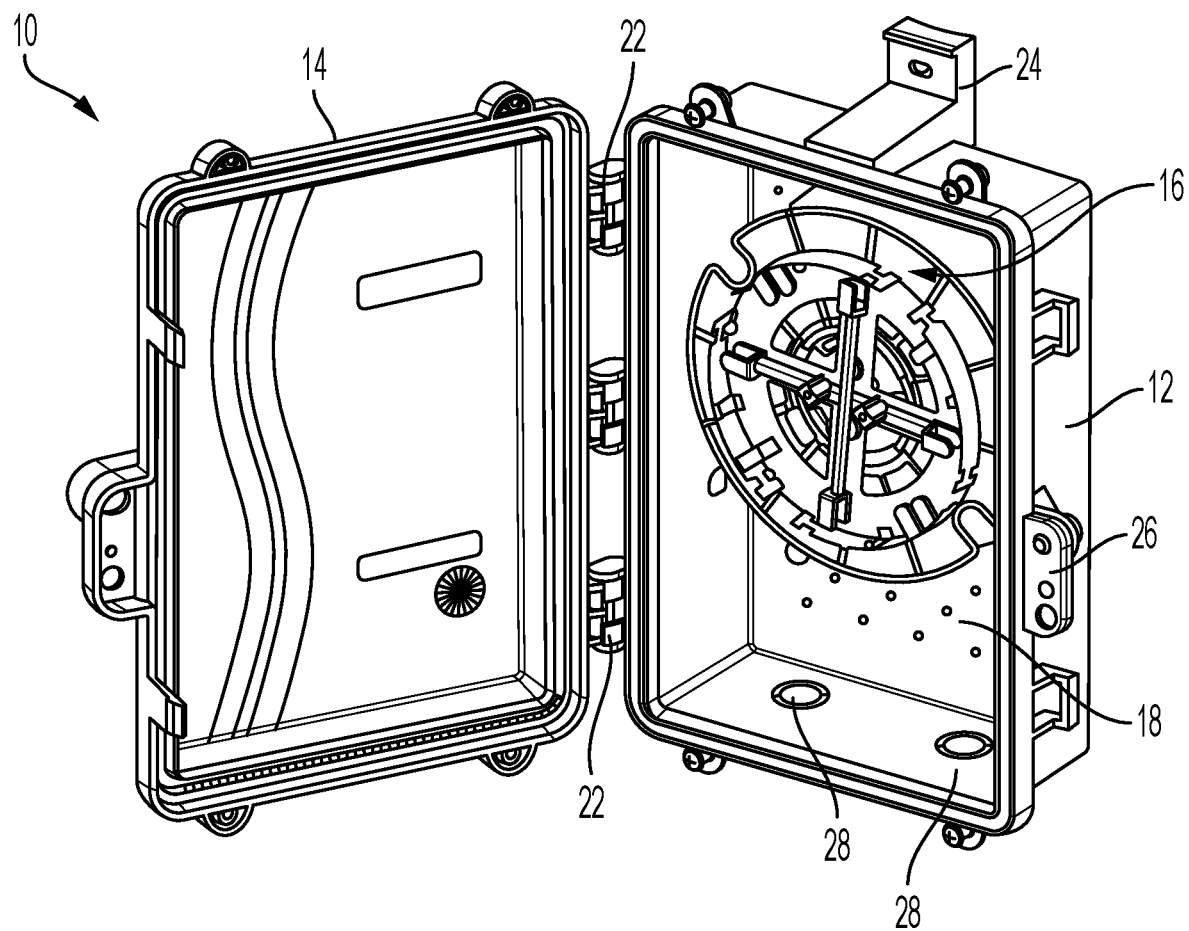
FIG. 1 is a perspective view of one embodiment of an optical fiber enclosure with an adjustable height cable reel installed therein according to aspects of the present disclosure.

FIG. 1 shows one embodiment of an enclosure 10. The enclosure 10 includes a housing 12 defining a storage space. In this embodiment, the housing 12 is a rectangular wall box. In other embodiments, the housing 12 may have a different shape, size, or configuration. The housing 12 may be connected to a hinged cover 14 for closing the enclosure 10. An adjustable height optical fiber reel 16 is mounted to a mounting wall 18 of the housing 12 (e.g., via one or more fasteners, clips, etc.) within the storage space. In one example, a spindle may be mounted to the mounting wall 18 of the enclosure 10, thereby supporting the cable reel 16. The housing 12 may further include hinges 22 for connecting the housing to the cover 14, one or more mounts 24 for mounting the enclosure 10 to a wall or other support structure, and a closure mechanism 26 for securing the cover 14 to the housing 12 at a free end of the cover 14. A grounding mount may also be connected to the mounting wall for providing a grounding location for a cable held in the enclosure 10. The housing 12 of the enclosure 10 may further include entry/exit ports 28 for a stored cable.

Figure 2A:
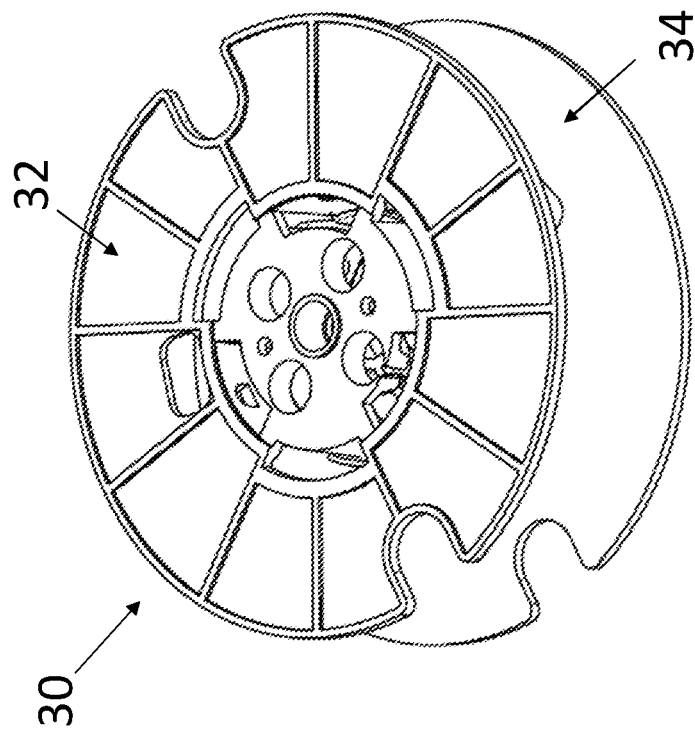
FIGS. 2A and 2B are perspective views of one embodiment of an adjustable height cable reel showing the cable reel in high and low positions according to aspects of the present disclosure.
Figure 2B:
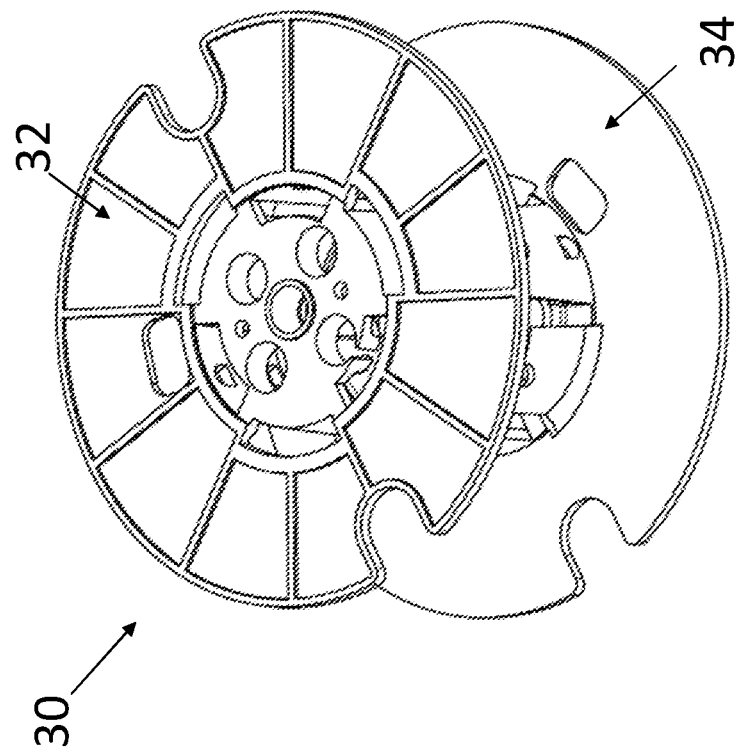
Figure 3B:
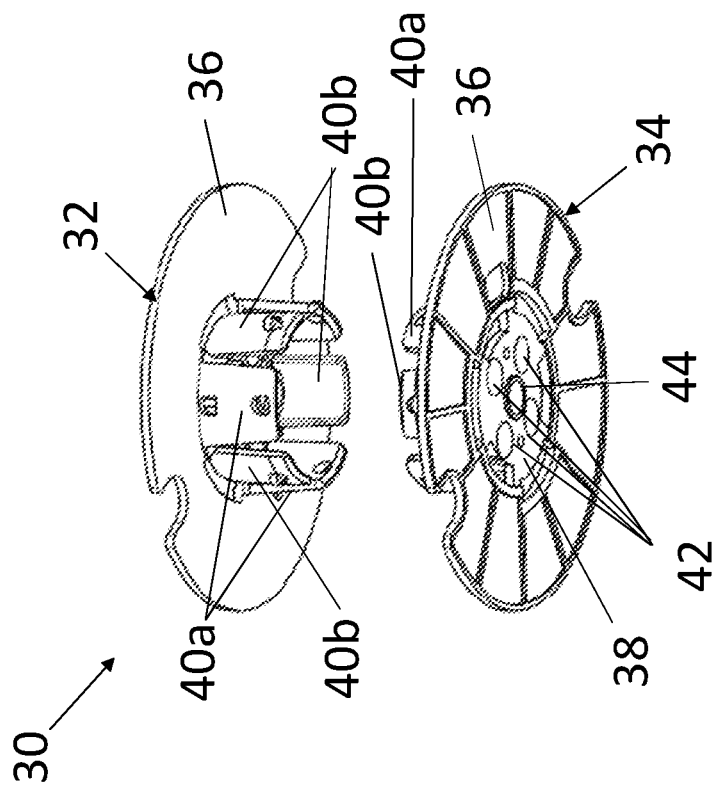
FIGS. 3A and 3B are perspective views of the disassembled cable reel of FIG. 2 according to aspects of the present disclosure.
Figure 3A:
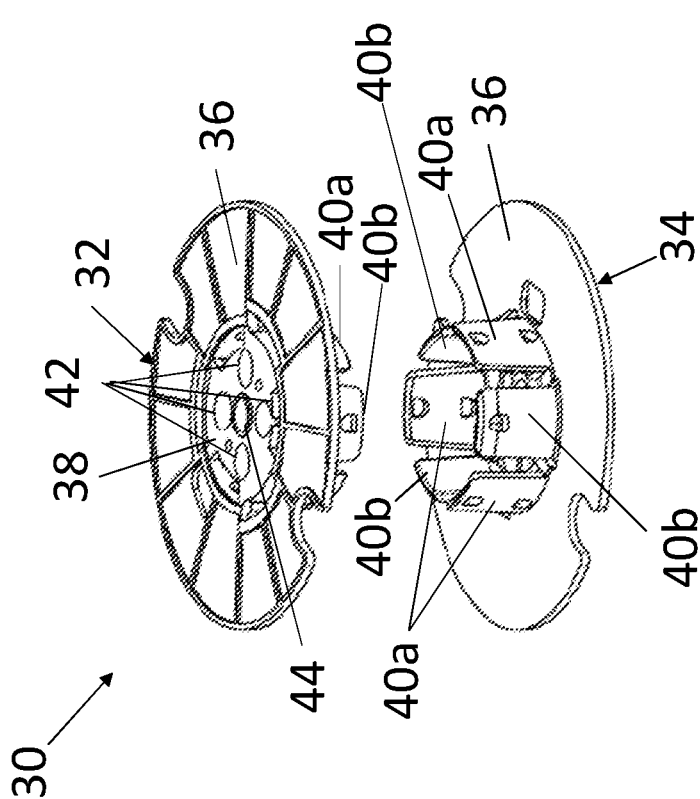

FIGS. 2A and 2B show one embodiment of an adjustable height cable reel 30. The reel 30 is shown in a high position in FIG. 2A, and a low position in FIG. 2B. The reel 30 comprises two pieces 32 and 34 coupled to each other to form the reel. The first piece 32 forms the top portion of the reel 30, and the second piece 34 forms the bottom portion of the reel. FIGS. 3A and 3B show the disassembled cable reel 30, as viewed from the top and bottom, respectively. The top piece 32 is shown decoupled from the bottom piece 34. In this embodiment, the two pieces 32 and 34 are symmetrical and identical pieces. In other embodiments, the pieces need not be symmetrical or identical and may have other shapes and configurations.

Figure 4:
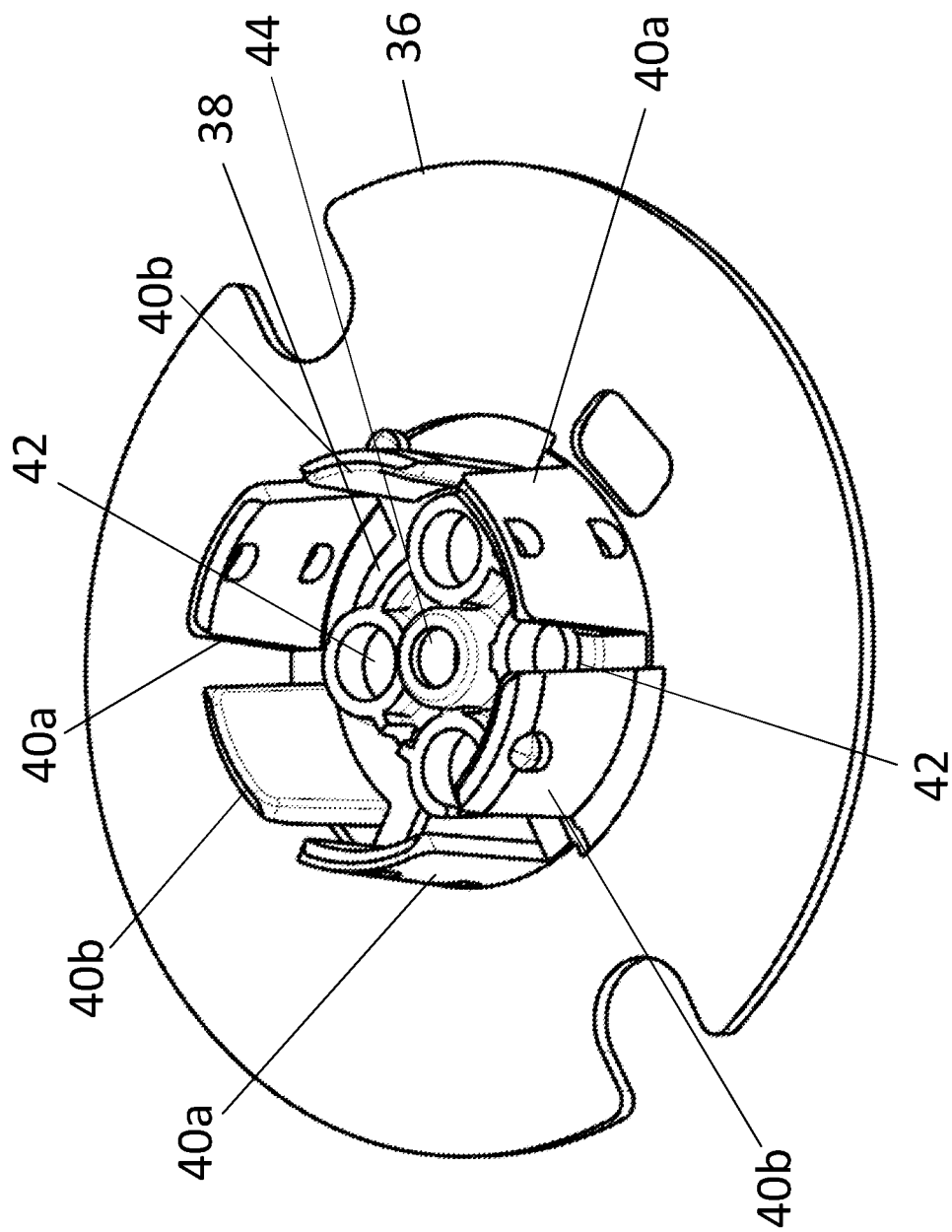
FIG. 4 is a perspective view of one piece of the cable reel of FIG. 2 configured according to aspects of the present disclosure.

FIG. 4 is a perspective view of one piece 34 of the cable reel 30. As shown in FIGS. 3A, 3B and FIG. 4, each piece 32 and 34 comprises a circular base plate 36 with a central portion 38. Each piece 32 and 34 further comprises a plurality of tabs 40 emanating from the base plate 36 towards one side of the base plate, such that each tab 40 is substantially perpendicular to the base plate 36. The tabs 40 may also be angled to facilitate coupling of the pieces 32 and 34 of the reel 30. The plurality of tabs 40 are arranged such that they form a cylindrical portion around the central portion 38 on one side of the base plate 36. Each tab 40 may be slightly curved such that the plurality of tabs 40 form a cylindrical shape. The plurality of tabs 40 comprise two types of tabs 40a and 40b arranged in an alternating order. In this example, each piece of the reel 30 comprises six tabs, including three tabs 40a of the first type and three tabs 40b of the second type. The tabs 40a and 40b alternate in order. The tabs 40a of the first piece 32 are configured to couple with the tabs 40b of the opposite piece 34. Similarly, the tabs 40b of the first piece 32 are configured to couple with the tabs 40a of the opposite piece 34, as described further below in relation to FIGS. 5 and 6.

In some embodiments, the central portion 38 may be a separate piece that may be coupled to the base plate 36, and the base plate may have a central opening configured to receive the central portion. In other embodiments, the central portion 38 may be formed integrally as part of the base plate 36. In some embodiments, the tabs 40 may be separate pieces that may be coupled to the base plate 36 and/or the central portion 38. In other embodiments, the tabs 40 may be formed integrally with the central portion 38, forming a cylindrical structure with the central portion at one end thereof, and the cylindrical structure may be received and coupled to a central opening of the base plate 36. In other embodiments, the tabs 40 may be formed integrally with both the base plate 36 and the central portion 38. That is, the entire piece 34 may be formed integrally as a single piece.

Referring again to FIGS. 3A, 3B, and 4, the central portion 38 has a plurality of receptacles 42 configured to couple the reel 30 to a slack storage tray, as described further below in relation to FIGS. 7 to 13. In this embodiment, there are four receptacles 42 arranged equidistantly apart around the central portion 38. In other embodiments, a different number or arrangement of receptacles may be provided. The central portion 38 further has a central receptacle 44. The receptacles 42 may be positioned equidistantly from the central receptacle 44. The central receptacle 44 may be configured to receive the shaft of a spindle. The spindle may be fastened to a mounting wall of an enclosure, such as the enclosure of FIG. 1, and may be configured to allow the reel 30 to rotate within the enclosure. In various embodiments, the base plate 36 may further comprise one or more apertures and/or one or more notches. The apertures or notches may be configured, for example, to receive fasteners for coupling the reel to a mounting surface, or may be configured to receive optical fiber cables therethrough.

FIG. 5 is a side view of the two pieces 32 and 34 of the cable reel 30 prior to assembly. As described above, each piece 32 and 34 comprises a base plate 36 and a plurality of curved tabs 40 comprising tabs 40a of a first type and tabs 40b of a second type. The tabs 40a and 40b are arranged in an alternating order such that they form a cylindrical portion protruding on one side of the base plate 36. Each tab 40 comprises a proximal portion 46 that is closest to the base plate 36, and a distal portion 48 that is farthest from the base plate. In some embodiments, as shown for example in FIG. 5, each tab 40 may be shaped such that the distal portion 48 of the tab is slightly narrower than its proximal portion 46. The tabs 40a and 40b may be angled to facilitate coupling of the pieces 32 and 34.

In FIG. 5, three of the six tabs 40 are shown from the side view of the reel 30. Each tab 40a of the first and second pieces 32 and 34 has two openings 50, including a first opening at the proximal portion 46 of the tab and a second opening at the distal portion 48 of the tab. Each tab 40b of the first and second pieces 32 and 34 has a pin 52 positioned at the distal portion 48 of the tab. The openings 50 on tabs 40a are configured to receive pins 52 on tabs 40b so as to couple the first piece 32 to the second piece 34. Each pin 52 protrudes radially outward from an exterior surface of each tab 40b. The pins 52 may be positioned substantially perpendicular to the tabs 40b. In some embodiments, the pins 52 may comprise a tapered portion configured to facilitate insertion of the pins into corresponding openings 50 on tabs 40a. The two openings 50 at the proximal and distal portions of the tabs 40a allow adjustment of the height of the reel 30 to either a low position or a high position based on whether the pins 52 are inserted into the proximal or distal openings. In this embodiment, two openings at proximal and distal portions of the tabs are provided, thereby allowing two discrete height adjustments of the reel. In other embodiments, additional openings may be provided on the tabs, to allow for additional discrete height settings for the reel. In yet other embodiments, a different number or configuration of tabs may be provided, or a different coupling mechanism may be provided for the pieces forming the reel, while allowing discrete or continuous adjustment of the reel height.

To assemble the reel by coupling the first piece 32 and the second piece 34, the first and second pieces are aligned such that the tabs 40a of the first piece 32 are positioned opposite the tabs 40b of the second piece 34, as shown for example in FIG. 5. The tabs 40b of the first piece 32 are thus positioned opposite the tabs 40a of the second piece 34. The adjustable height reel 30 is assembled by pushing the two pieces 32 and 34 together. The tabs 40 may be angled to ease the assembly when the pieces 32 and 34 are pushed together.

FIGS. 6A and 6B are side views of the assembled cable reel 30 in high and low positions respectively. To configure the reel in the high position as shown in FIG. 6A, the pins 52 of the tabs 40b on each of the first and second pieces 32 and 34 are inserted into the distal openings 50 of the opposite tabs 40a. As the pieces 32 and 34 are assembled, the tabs 40a having the openings 50 are positioned radially exterior relative to the tabs 40b having the pins 52, as the tabs 40b are pushed inward to insert the pins 52 into the openings 50.

To change the configuration of the reel 30 to the low position as shown in FIG. 6B, the pieces 32 and 34 may be pushed together further until the pins 52 slide past the distal openings 50 into the proximal openings 50. Alternatively, to configure the reel 30 in a low position, the pieces 32 and 34 may be positioned such that the pins 52 and the openings 50 are not in alignment. The pins 52 may be slightly off from the openings 50 to prevent the pins 52 from engaging the distal opening 50. Instead, the pieces 32 and 34 are pushed together until the pins 52 are past the distal openings 50. As the pins 52 go past the distal portion of the opposite tabs, the pieces 32 and 34 may be rotated to insert the pins 52 into the proximal openings 50. The reel 30 may also be reconfigured from a low position to a high position, for example, by pushing the tabs 40b inwards to disengage the pins 52 from the openings 50, as the pins 52 act as locks to prevent the pieces 32 and 34 from decoupling.

As the first and second pieces 32 and 34 are assembled to form the reel 30, the tabs 40 are locked between the respective base plates of the first and second pieces. The tabs 40 form an inner cylindrical portion with a diameter smaller than the diameter of the base plates. Thus, optical fiber cable may be stored between the base plates and around the smaller diameter cylindrical portion formed by the tabs.

Various embodiments of the adjustable height reels disclosed herein may store different lengths of optical fiber cable, such as 3 mm fiber cable, based on the size and position of the reel. For example, the reel 30 of FIG. 6 has a diameter of about 4.55 inches, as shown by the horizontal arrows in FIG. 6B. The reel 30 has a height of about 1.35 inches in the high position, as shown by the vertical arrows in FIG. 6A, and a height of about 0.77 inches in the low position, as shown by the vertical arrows in FIG. 6B. The reel 30 is thus height adjustable by about 0.58 inches. The reel 30 may hold about 50 feet of 3 mm fiber cable in the low position, and about 100 feet of 3 mm fiber cable in the high position. Other embodiments of the reel 30 may be sized differently. For example, in another embodiment, the reel may have a diameter of about 6 inches. A 6 inch reel with a height of about 0.77 inches in the low position may hold about 100 feet of 3 mm fiber cable in the low position. A 6 inch reel with a height of about 1.35 inches in the high position may hold about 200 feet of 3 mm fiber cable in the high position. The reel may also hold, for example, 125 feet of 4 mm, 24 fiber micro cable, or 100 feet of 5.5 mm OSP cable.

Figure 7B:
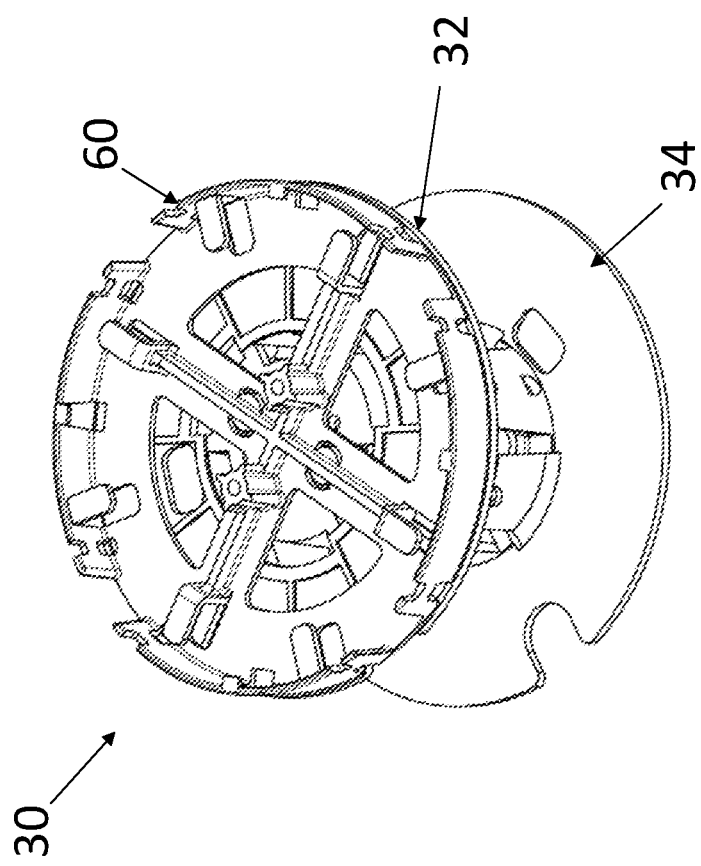
FIGS. 7A and 7B are perspective views of the low and high positions of the adjustable height cable reel of FIG. 2 coupled to a slack storage tray according to aspects of the present disclosure.
Figure 7A:
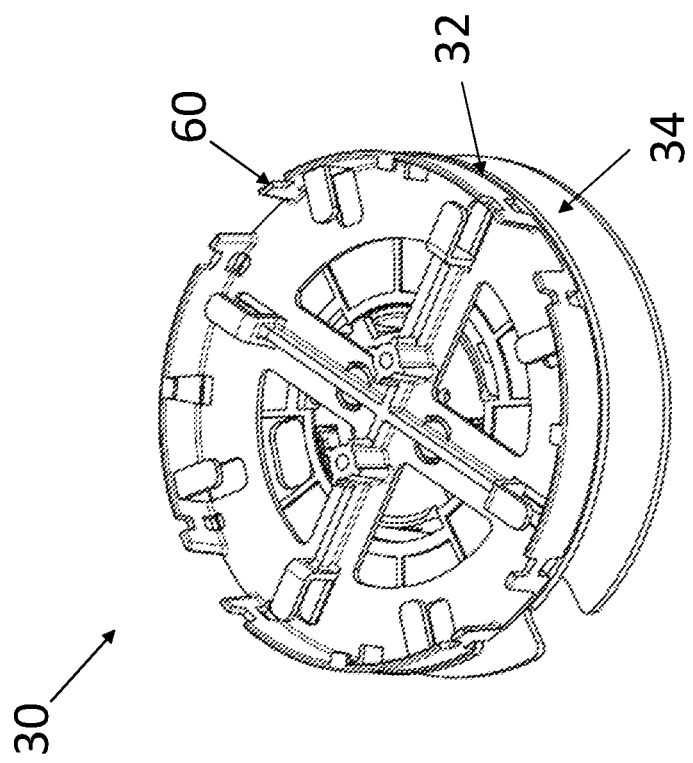
Figure 8B:
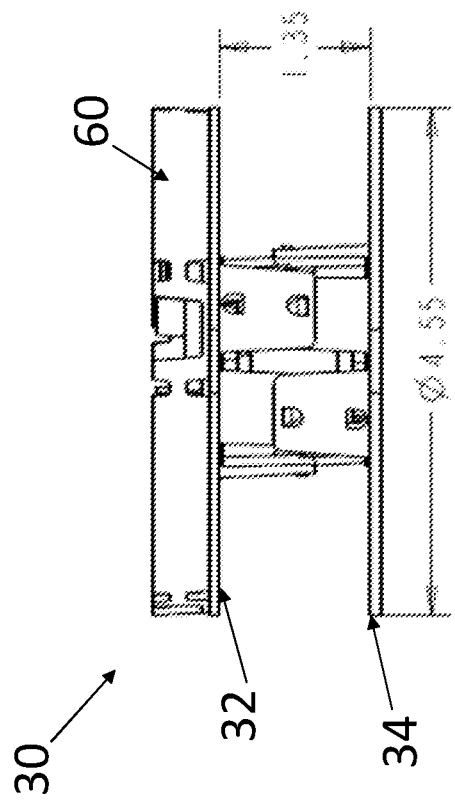
FIGS. 8A and 8B are side views of the low and high positions of the adjustable height cable reel of FIG. 7 according to aspects of the present disclosure.
Figure 8A:
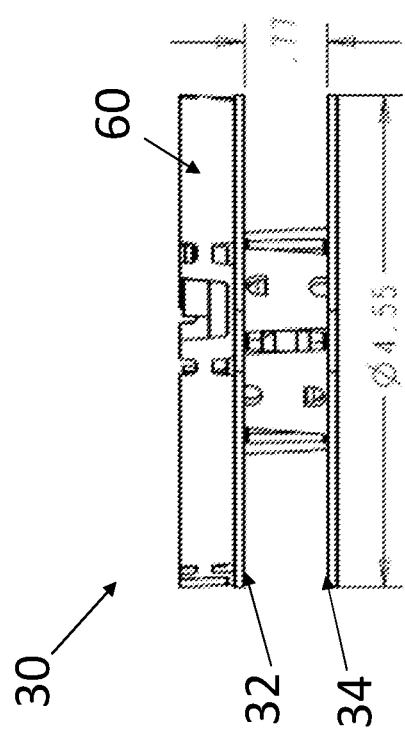

Various embodiments of reels may further comprise a slack storage tray. FIGS. 7A and 7B show the low and high positions of the adjustable height cable reel 30 coupled to a slack storage tray 60. FIGS. 8A and 8B are side views of the low and high positions of the adjustable height cable reel 30 coupled to the slack storage tray 60. The slack storage tray 60 is configured to hold, for example, up to about 2 feet of 3 mm fiber cable. This is in addition to the length of cable stored in the reel 30.

Figure 10:
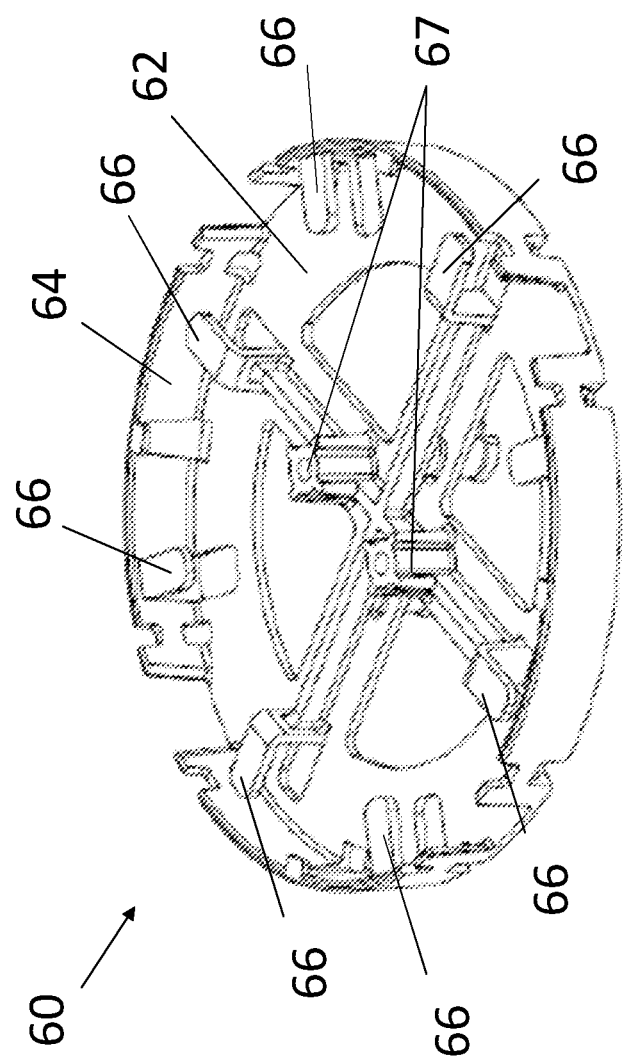
FIG. 10 is a perspective view of one embodiment of a slack storage tray according to aspects of the present disclosure.

FIGS. 9A and 9B show perspective top and bottom views of the disassembled cable reel 30 and the slack storage tray 60. FIG. 10 shows a perspective view of the slack storage tray 60. Referring to FIGS. 9A, 9B and 10, the slack storage tray 60 comprises a base 62 and a circumferential wall 64 forming a cylindrical structure around the base. The circumferential wall 64 may have one or more notches or openings configured to allow entry or exit of slack optical fiber into the slack storage tray 60. The slack storage tray 60 further comprises a plurality of protrusions 66 extending at various spaced locations at the base 62 and on the circumferential wall 64 and configured as hold-backs for cable slack that may be stored within the slack storage tray. The slack storage tray 60 further comprises protrusions 67 protruding upward from the base 62 and configured for storage of slack fiber within the slack storage tray.

Figures 11A, 11B, 11C:
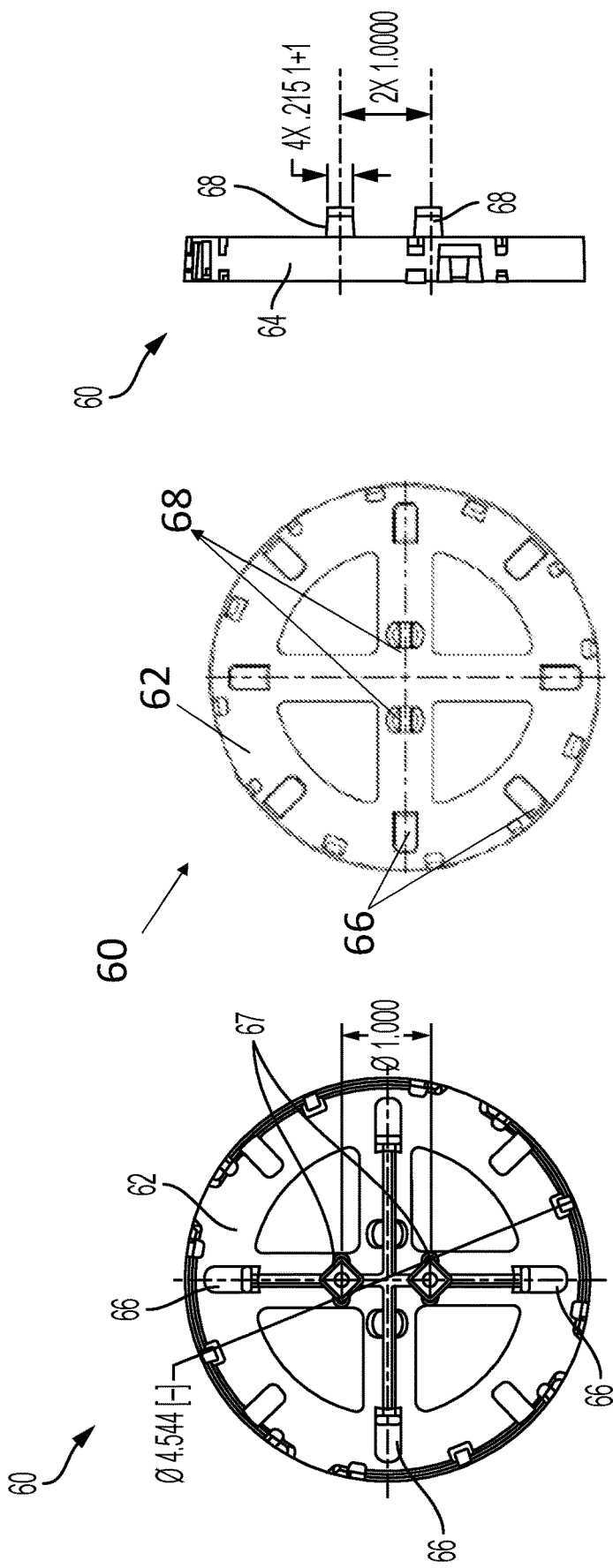
FIGS. 11A, 11B, and 11C are top, bottom, and side views respectively of the slack storage tray of FIG. 10 according to aspects of the present disclosure.

The slack storage tray 60 further comprises features for mounting the tray to the reel 30. The reel 30 may include a plurality of receptacles 42, for example for receiving mating components 68 of the slack storage tray 60. The receptacles 42, in one embodiment, include four locations and are equally spaced at 90 degrees around the central portion 38 of the reel 30. The receptacles 42 may be aligned with the mating components 68 of the slack storage tray 60 in some embodiments. Two mating components 68 protrude from the bottom of the slack storage tray 60 as shown in FIG. 9B, and are configured to mate with two receptacles 42 of the top piece 32. The receptacles 42 of the reel 40 and the mating components 68 of the slack storage tray 60 are not limited to being in the number depicted and could be arranged in other configurations. FIGS. 11A, 11B, and 11C are top, bottom, and side views respectively of the slack storage tray 60, further showing the features described above in relation to FIGS. 9A, 9B, and 10.

Figure 12:
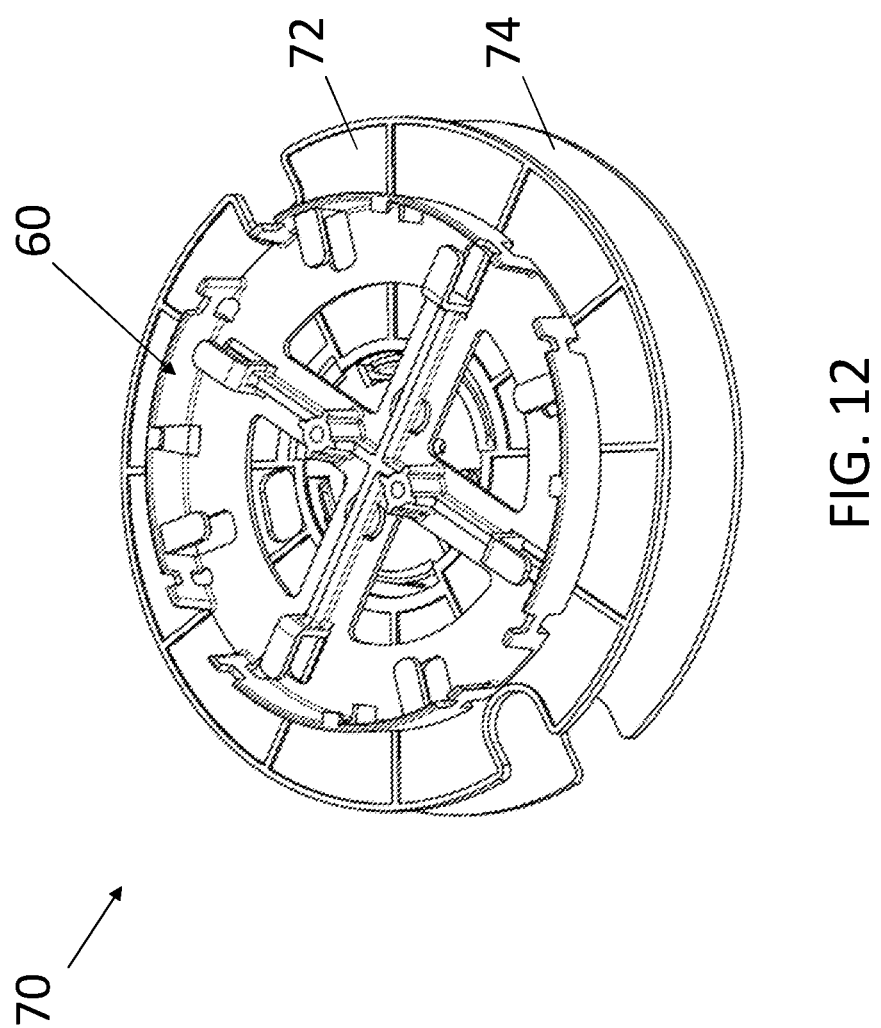
FIG. 12 is a perspective view of another embodiment of a cable reel according to aspects of the present disclosure.
Figure 13:
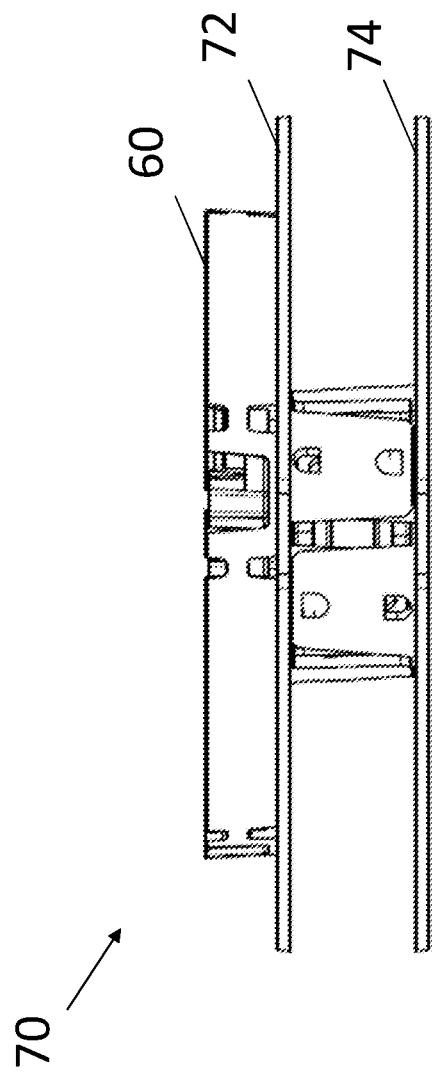
FIG. 13 is side view of the cable reel of FIG. 12 according to aspects of the present disclosure.

FIG. 12 shows another embodiment of a cable reel 70 with the slack storage tray 60 coupled thereto. The reel 70 is an adjustable height reel. For example, FIG. 13 is side view of the cable reel 70, showing the reel in a low position. The reel 70 comprises pieces 72 and 74 are configured as described above for the reel pieces 32 and 34. The cable reel 70 is larger than the reel 30 of FIGS. 2 to 9, having a diameter of about 6 inches. In this embodiment, the slack storage tray 60 is smaller than the reel pieces 72 and 74. In other embodiments, a larger reel may accommodate a larger slack storage tray. The slack storage tray 60 may also optionally be removed from the reel 70.

Referring again to FIG. 1, the enclosure 10 includes an adjustable height reel 16 having a slack storage tray configured according to aspects disclosed herein. Various embodiments of reels disclosed herein may be used in a variety of enclosures, including but not limited to optical fiber terminals, wall boxes, pedestals, and cabinets. Various embodiments of the optical fiber reels and enclosures disclosed herein are designed to fast-track and simplify fiber installations. Various embodiments have a compact design that efficiently uses available space. Various embodiments disclosed herein are simpler and easier to use than conventional reels and enclosures.

In some embodiments, the enclosure may provide 12 SC or 24 LC connections on the front of the spool and MPO, plug-and-play, SC/LC breakouts or pigtails on the back side of the spool. Various embodiments of the enclosure may provide fiber terminations that are Telcordia GR-326 compliant. Various embodiments may support all industry standard single mode and multi-mode connectors. Various embodiments of the enclosure have less than or equal to about 0.2 dB insertion loss, exceeding industry standards.

Various embodiments may be configured for both indoor and outdoor use. Various embodiments of the enclosure may include a gasket seal for protection from elements. In various embodiments, the enclosure may have one or more sealed or sealable ports for protection from elements or operation in an outdoor environment. Some embodiments may be made of high-impact and flame retardant PVC for durability.

Various embodiments of the optical fiber enclosure may be configured for wall mounting. In some embodiments, the enclosure may include a security screw with the ability to secure with padlock.

Various embodiments of the optical fiber reels and enclosure may be configured to accept a variety of drop cables. Various embodiments of the enclosure may be integrated into any network architecture and deployment. For example, the enclosure may be used in a fiber distribution system comprising one or more distribution terminals. In some embodiments, the fiber distribution system may comprise a plurality of distribution terminals arranged in a daisy chained configuration. A distribution terminal may have at least one feeder port and a plurality of distribution ports. Each of the at least one feeder port and the plurality of distribution ports may be sealable ports configured to receive a duct configured to receive pushable fiber therethrough or a connector, and the connector may be configured to interface with a drop type cable. The fiber distribution system may comprise an enclosure configured according to aspects of the present disclosure. The enclosure may be configured as a tap box for mounting at a user location. The enclosure may have at least one sealable port configured to receive one of a connector and a duct configured to receive pushable fiber therethrough, and may include a spool. In some embodiments, the sealable ports of the enclosure may further include anti-rotation locking features.

In some embodiments, the distribution terminal may be configured to receive a fiber through the feeder port and to output a plurality of fibers through the plurality of distribution ports of the terminal, at least one fiber of the plurality of fibers being received by the enclosure through the sealable port of the enclosure.

In some embodiments, the terminal may be configured to receive a plurality of swappable modules. In some embodiments, the module may be configured to receive different types of splitters having different split ratios. In some embodiments, the module may be configured to receive any optical component, including any type of connector.

In some embodiments, the enclosure may comprise a single reel. The reel may optionally have a slack storage tray. In other embodiments, the enclosure may comprise a plurality of reels, each of which may optionally have a slack storage tray. In some embodiments, the plurality of reels may be stackable and configured to provide slack storage, for example, of about 600 feet.

The fiber distribution system may further comprise a plurality of connectors. The connectors may be configured to couple with a plurality of distribution ports of the distribution terminal. The adapter plate of the enclosure may be configured to receive the connectors. In some embodiments, each connector of the plurality of connectors may be configured to receive epoxy so as to provide a hardened connector.

In some embodiments, the enclosure may comprise a mount configured to attach the enclosure to a user location. The enclosure may comprise at least one sealable port configured to receive one of a connector and a duct configured to receive pushable fiber therethrough. The enclosure may comprise at least one port configured to provide a drop cable to the user location, and at least one reel. In some embodiments, the enclosure may be configured to provide a plurality of different types of drop cables.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

We claim:

1. An adjustable height reel comprising:
   a first piece forming a bottom portion of the reel;
   a second piece forming a top portion of the reel;
   each of the first piece and the second piece comprising:
      a base;
      one or more first tabs protruding from the base, each of the one or more first tabs comprising a first opening and a second opening, wherein the first opening is disposed at a distal portion of each first tab of the one or more first tabs, and the second opening is disposed at a proximal portion of each first tab of the one or more first tabs; and
      one or more second tabs protruding from the base, each of the one or more second tabs comprising a pin, wherein the pin of the first piece is configured to selectively engage the first opening of the second piece to lock the adjustable height reel at a first height, or to selectively engage the second opening of the second piece to lock the adjustable height reel at a second height.

2. The adjustable height reel of claim 1, wherein the first piece and the second piece are substantially identical.

3. The adjustable height reel of claim 1, wherein each of the first piece and the second piece are formed integrally as a single piece.

4. The adjustable height reel of claim 1, wherein the one or more first tabs comprise two or more first tabs, and wherein one or more second tabs comprise two or more second tabs, wherein the one or more first tabs and the one or more second tabs are arranged in an alternating order to form a substantially cylindrical shape extending from the base.

5. The adjustable height reel of claim 4, wherein the base has a first diameter, and the substantially cylindrical shape has a second diameter smaller than the first diameter.

6. The adjustable height reel of claim 4, wherein the two or more first tabs comprise three first tabs, and wherein the two or more second tabs comprise three second tabs.

7. The adjustable height reel of claim 1, wherein the one or more first tabs and the one or more second tabs are shaped with a distal portion that is narrower than a proximal portion to facilitate coupling of the first piece with the second piece.

8. The adjustable height reel of claim 1, wherein the one or more first tabs and the one or more second tabs are angled to facilitate coupling of the first piece with the second piece.

9. The adjustable height reel of claim 1, wherein one or more of first piece and the second piece further comprise a central receptacle configured to receive a shaft of a spindle.

10. The adjustable height reel of claim 9, wherein the spindle is fastened to a mounting wall of an enclosure to all allow the reel to rotate within the enclosure.

11. The adjustable height reel of claim 1, wherein the pin is disposed at a distal portion of each of second tab of the one or more second tabs.

12. The adjustable height reel of claim 1, wherein the second height is smaller than the first height.

13. The adjustable height reel of claim 1, further comprising a slack storage tray configured to couple to at least one of the first piece and the second piece.

14. The adjustable height reel of claim 13, wherein at least one of the first piece and the second piece further comprises a central portion having a plurality of receptacles for coupling to the slack storage tray.

15. The adjustable height reel of claim 13, wherein the slack storage tray further comprises a plurality of protrusions configured to hold slack fiber.

16. The adjustable height reel of claim 13, wherein the slack storage tray comprises a circumferential wall having one or more openings configured to allow entry or exit of slack optical fiber into the slack storage tray.

17. An enclosure comprising:
    a housing having an interior space and a cover; and
    an adjustable height reel configured to mount within the interior space, and comprising:
       a first piece forming a bottom portion of the reel;
       a second piece forming a top portion of the reel;
       each of the first piece and the second piece comprising:
          a base;
          one or more first tabs protruding from the base, each of the one or more first tabs comprising a first opening and a second opening, wherein the first opening is disposed at a distal portion of each first tab of the one or more first tabs, and the second opening is disposed at a proximal portion of each first tab of the one or more first tabs; and
          one or more second tabs protruding from the base, each of the one or more second tabs comprising a pin, wherein the pin of the first piece is configured to selectively engage the first opening of the second piece to lock the adjustable height reel at a first height, or to selectively engage the second opening of the second piece to lock the adjustable height reel at a second height.

18. The enclosure of claim 17, further comprising a gasket seal configured to protect the interior space from elements.

19. The enclosure of claim 17, wherein each of the first piece and the second piece are formed integrally as a single piece, and wherein the one or more first tabs comprise two or more first tabs, and wherein one or more second tabs comprise two or more second tabs, wherein the one or more first tabs and the one or more second tabs are arranged in an alternating order to form a substantially cylindrical shape extending from the base.

\* \* \* \* \*